(12) United States Patent
Bar-Tal et al.

(10) Patent No.: US 10,331,142 B2
(45) Date of Patent: Jun. 25, 2019

(54) MONITORING OF VEHICLE PASSING MANEUVER

(71) Applicant: Eyedog Israel Ltd., Ashdod (IL)

(72) Inventors: Mordehai Bar-Tal, Ashdod (IL); Reuven Nanikashvili, Ashdod (IL)

(73) Assignee: EYEDOG ISRAEL LTD., Ashdod (IL)

( * ) Notice: Subject to any disclaimer, the term of this patent is extended or adjusted under 35 U.S.C. 154(b) by 51 days.

(21) Appl. No.: 15/596,435

(22) Filed: May 16, 2017

(65) Prior Publication Data

US 2018/0081371 A1 Mar. 22, 2018

Related U.S. Application Data

(60) Provisional application No. 62/396,173, filed on Sep. 18, 2016.

(51) Int. Cl.
| | |
|---|---|
| *G05D 1/02* | (2006.01) |
| *G05D 1/00* | (2006.01) |
| *G08G 1/0967* | (2006.01) |
| *G08G 1/052* | (2006.01) |
| *G08G 1/0962* | (2006.01) |

(52) U.S. Cl.
CPC ......... *G05D 1/0253* (2013.01); *G05D 1/0088* (2013.01); *G05D 1/0212* (2013.01); *G05D 1/0246* (2013.01); *G05D 1/0248* (2013.01); *G05D 1/0274* (2013.01); *G08G 1/052* (2013.01); *G08G 1/09626* (2013.01); *G08G 1/096708* (2013.01); *G05D 2201/0213* (2013.01)

(58) Field of Classification Search
CPC .. G05D 1/0253; G05D 1/0088; G05D 1/0212; G05D 1/0246; G05D 1/0248; G05D 1/0274; G08G 1/052; G08G 1/09626; G08G 1/096708
USPC .......................................................... 701/23
See application file for complete search history.

(56) References Cited

U.S. PATENT DOCUMENTS

| | | | | |
|---|---|---|---|---|
| 8,346,426 B1* | 1/2013 | Szybalski | ............. | B60W 50/14 701/25 |
| 8,781,669 B1* | 7/2014 | Teller | ..................... | G05D 1/021 700/245 |
| 9,523,984 B1* | 12/2016 | Herbach | .............. | B62D 15/025 |
| 2014/0018995 A1* | 1/2014 | Ferguson | ........... | G06K 9/00798 701/25 |
| 2014/0207325 A1* | 7/2014 | Mudalige | ............. | B62D 15/025 701/26 |

(Continued)

*Primary Examiner* — Thomas G Black
*Assistant Examiner* — Luat T Huynh
(74) *Attorney, Agent, or Firm* — Browdy and Neimark, P.L.L.C.

(57) ABSTRACT

A system and methods are provided for generating a safety level notification with respect to a passing vehicle maneuvering to overtake a leading vehicle by travelling in a lane designated for opposing traffic. The system may include a camera having a narrow bandwidth emitter, an image sensor, a lens subsystem and a processor. The processor is configured to perform the steps of: determining a speed and a position of the leading vehicle; receiving images from the camera; processing the images to calculate a-speed and a position of an on-coming vehicle travelling in the lane designated for opposing traffic and approaching the passing vehicle; responsively determining a safety level of performing an overtaking maneuver; and providing a notification of the safety level to a driver of the passing vehicle.

19 Claims, 12 Drawing Sheets

(56) References Cited

U.S. PATENT DOCUMENTS

2015/0254986 A1* 9/2015 Fairfield ............... G08G 1/22
  707/687
2018/0058879 A1* 3/2018 Tayama ............... B60K 35/00

* cited by examiner

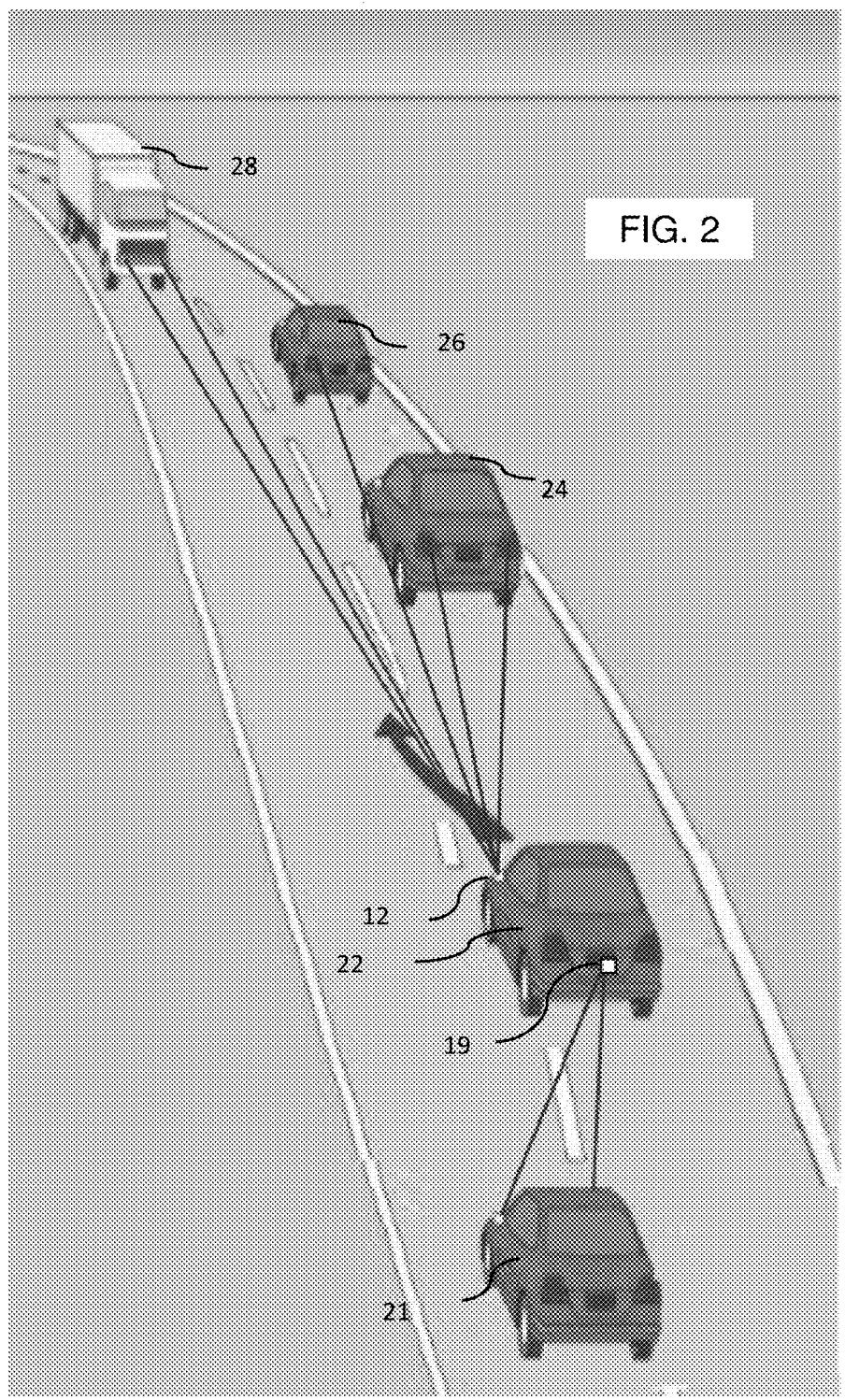

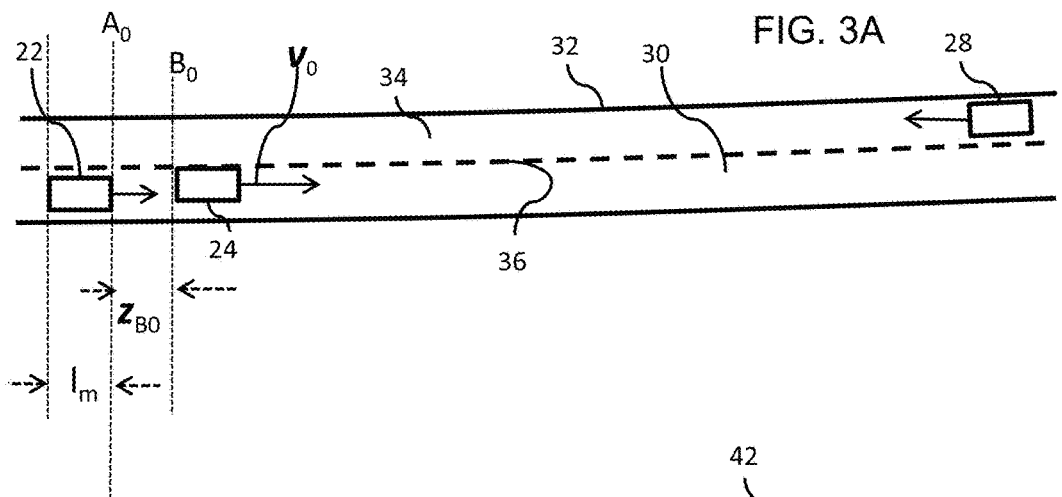
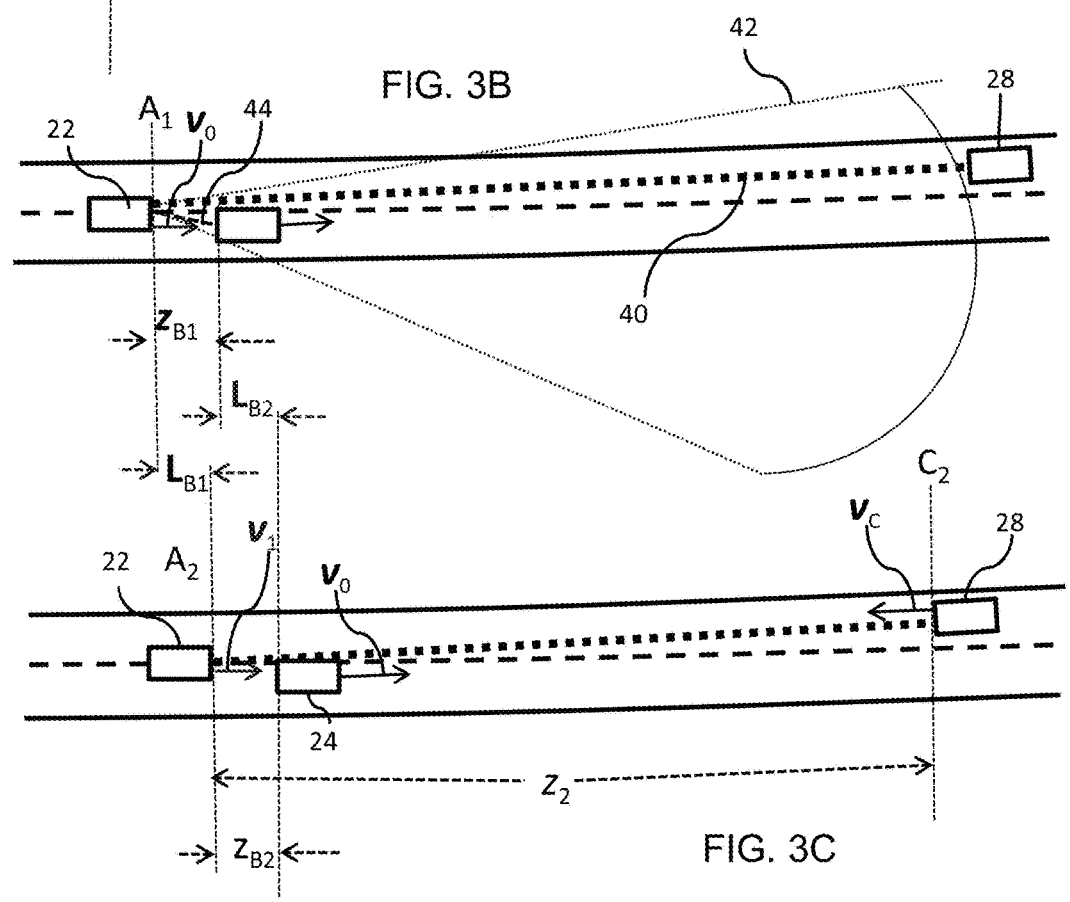

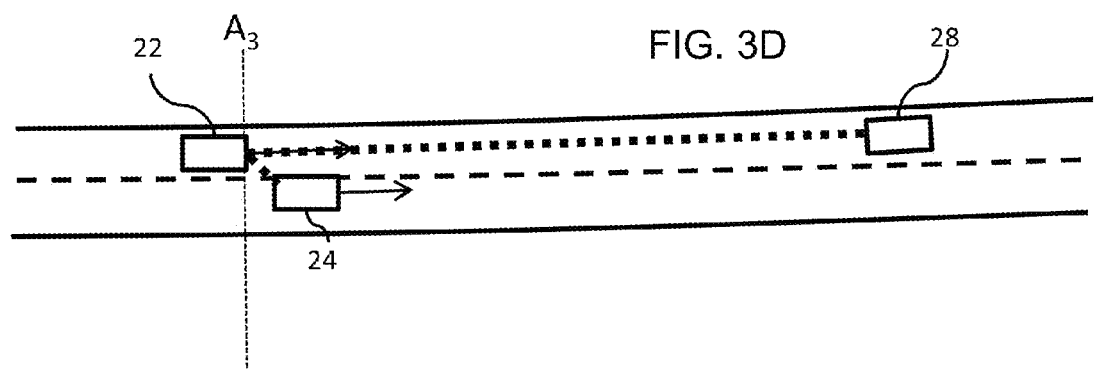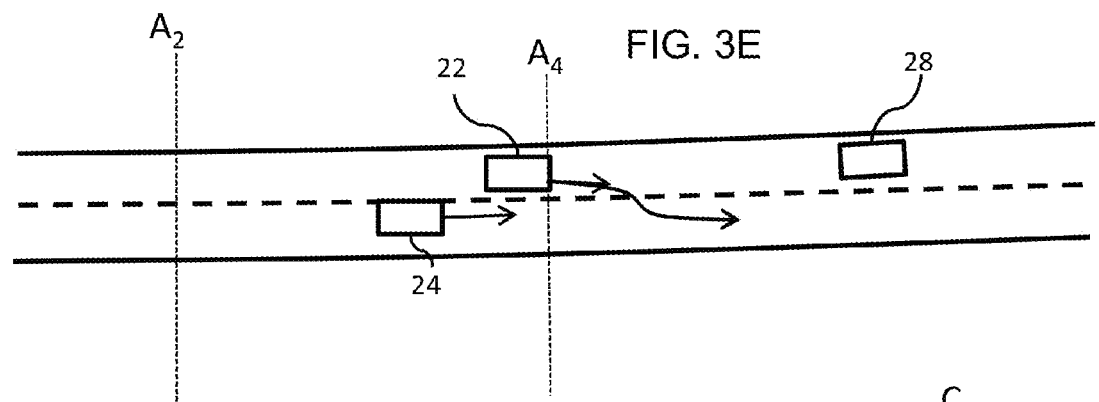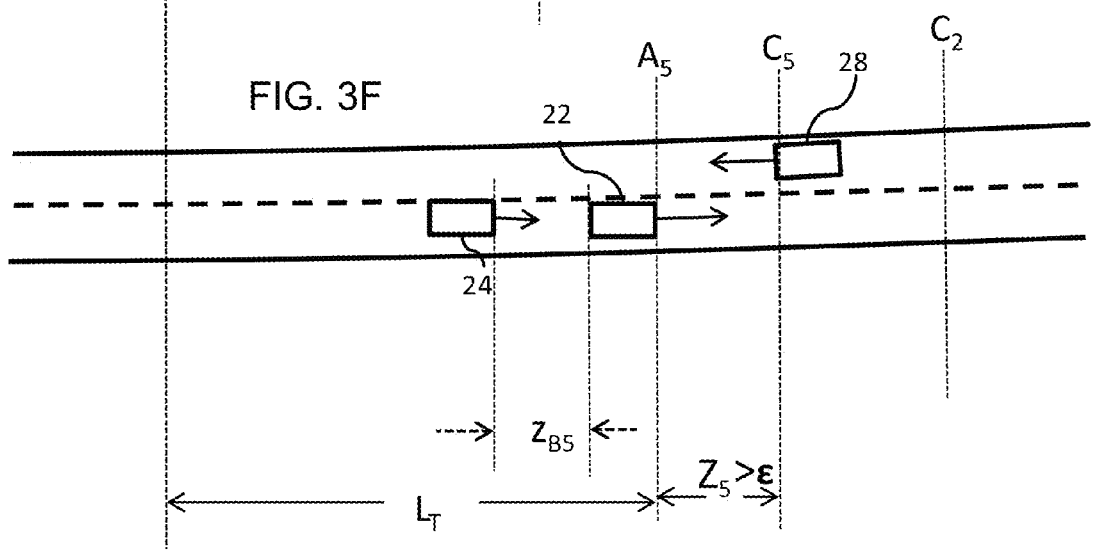

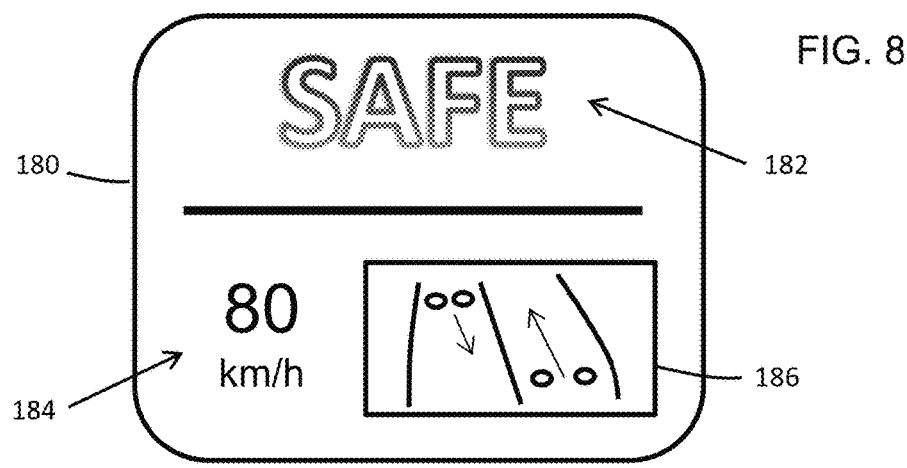
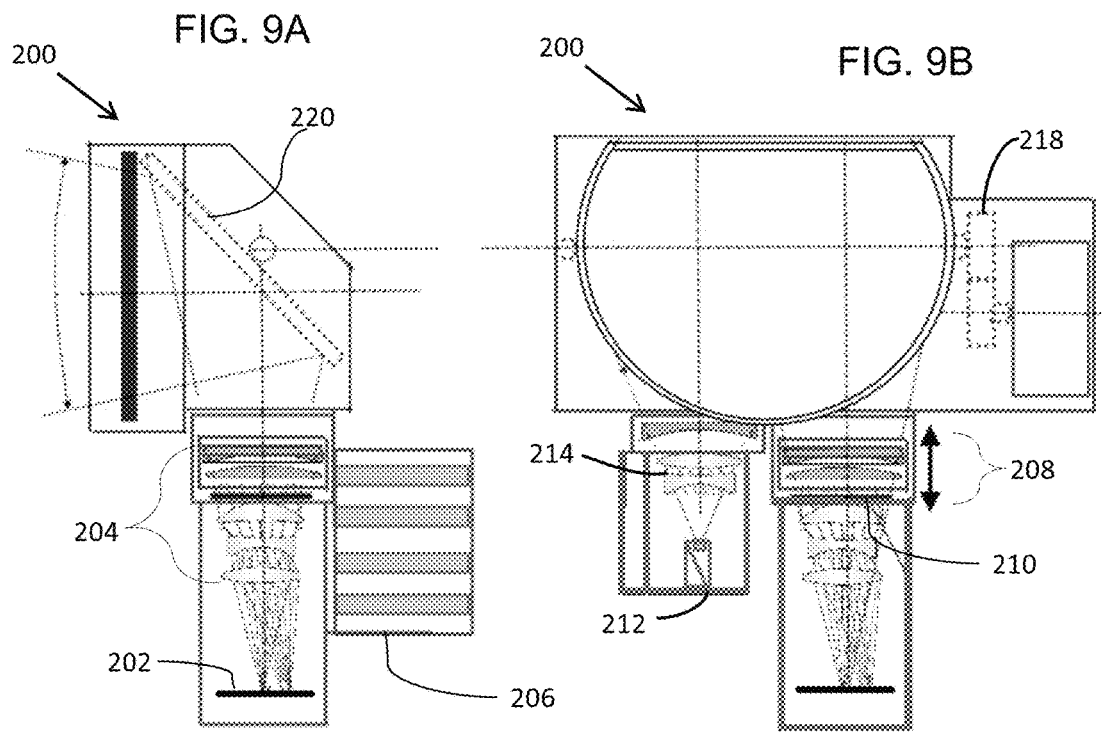

MONITORING OF VEHICLE PASSING MANEUVER

RELATED APPLICATION DATA

The present application claims priority from U.S. Provisional Patent Application No. 62/396,173, filed on Sep. 18, 2016 and incorporated herein by reference.

FIELD OF THE INVENTION

The present invention is directed to systems and methods for vehicle monitoring and automation.

BACKGROUND

Advanced Driver Assistance Systems (ADAS) and self-driving systems encompass a range of technologies that are developing to improve road safety and energy efficiency. To further improve the safety of such technologies, practical implementations are needed for the driving maneuver of entering a lane of opposing traffic in order to overtake a vehicle (such as a car or truck) on a two-lane road. The maneuver can be dangerous and is one of the main causes of road accidents and fatalities.

SUMMARY

Embodiments of the present invention provide systems and methods for increasing the safety and efficiency of the driving maneuver of overtaking a vehicle by driving in an opposing lane designated for on-coming traffic. According to an embodiment of the present invention, a system may include a camera, including a light emitter configured to emit a narrow bandwidth light, an image sensor, and a lens subsystem, and a processor communicatively coupled to the camera and to a memory that stores computer-readable instructions. The instructions cause the processor to perform the steps of: determining a speed and a position of the leading vehicle; receiving images from the camera; processing the images to calculate a speed and a position of an on-coming vehicle travelling in the opposing lane and approaching the passing vehicle; responsively to the speeds and positions of the leading and on-coming vehicles, determining a safety level of performing an overtaking maneuver; and providing a notification of the safety level to a driver of the passing vehicle.

The driver may be a human driver or an autonomous system for controlling the passing vehicle. In some embodiments, determining the safety level may include determining a required passing speed. In further embodiments, determining the required passing speed may include acquiring location data and determining that the required passing speed does not exceed the legal maximum speed at the vehicle location. In additional embodiments, providing the notification includes providing an indication of the required passing speed.

The driver may be a human driver and the system may be further configured to display the notification of the safety level on a screen viewable by the driver. The display may be a stand-alone display, or an existing vehicle multimedia/GPS navigation system display, or a smartphone/PDA display.

In further embodiments, the driver may be an autonomous system and the system may be further configured to transmit calculated data and notifications to the autonomous system. The safety level notification may be one of a set of possible notifications comprising a first notification that the maneuver is safe and a second notification that the maneuver is unsafe. The processor may be further configured to identify a start of the maneuver, and to continue performing safety level calculations and providing additional safety level notifications while the maneuver is in progress.

The processor may be further configured to receive a driver input to initiate the overtaking calculation. The processor may be configured to receive location data that the passing vehicle is traveling on a two-lane road, and the driver input may be from a turn signal, or from an indication of the passing vehicle crossing a road dividing line, or from a verbal instruction.

In some embodiments, processing the images may include identifying a representation of the on-coming vehicle in the images. Identifying the representation of the on-coming vehicle may include identifying reflections of the narrow bandwidth light from at least two positions on the on-coming vehicle, and wherein calculating the speed and position of the on-coming vehicle includes determining a change in positions of the reflections between at least three of the images. Calculating the speed and position of the on-coming vehicle further may include receiving the images while the speed of the passing vehicle is changing. Identifying the representation of the on-coming vehicle includes adjusting a zoom and field of view of the camera.

In additional embodiments, receiving the images further includes determining a contour of the opposing lane from location data and responsively orienting the camera to a view of the lane. The laser emitter and the image sensor may respectively transmit and receive laser pulses through one or more common lenses of the lens subsystem. Determining a speed and a position of the leading vehicle may include determining a speed and a position of two leading vehicles, and the processor may be further configured to determine a safety level of overtaking both leading vehicles.

In further embodiments, the camera is a front camera and the system further includes a back camera, and the processor is further configured 1) to perform the steps of: determining from images from the back camera that the passing vehicle can safely return from the opposing lane to a position in front of the leading vehicle; and providing a notification that return from the opposing lane is safe. The present invention will be more fully understood from the following detailed description of embodiments thereof.

BRIEF DESCRIPTION OF DRAWINGS

The accompanying drawings illustrate embodiments of the disclosed subject matter and explain principles of embodiments of the disclosed subject matter. Structural details are shown only to the extent necessary for an understanding of the disclosed subject matter and the various ways in which it may be practiced.

FIG. 2 is a schematic, pictorial illustration of a vehicle employing a monitoring system, according to an embodiment of the present invention.

FIGS. 3A-3G are schematic, pictorial illustrations of steps of operation of a monitoring system, according to an embodiment of the present invention.

FIG. 8 is a schematic, pictorial illustration of an in-vehicle display screen for providing safety notifications, according to an embodiment of the present invention.

FIGS. 9A and 9B are pictorial orthogonal views of a common deflector camera for recording images of on-coming traffic, according to an embodiment of the present invention.

DETAILED DESCRIPTION OF THE INVENTION

In the following detailed description of various embodiments, reference is made to the accompanying drawings that form a part thereof, and in which are shown by way of illustrating specific embodiments by which the invention may be practiced. It is understood that other embodiments may be envisioned and structural changes made without departing from the scope of the present invention.

Figure 1:
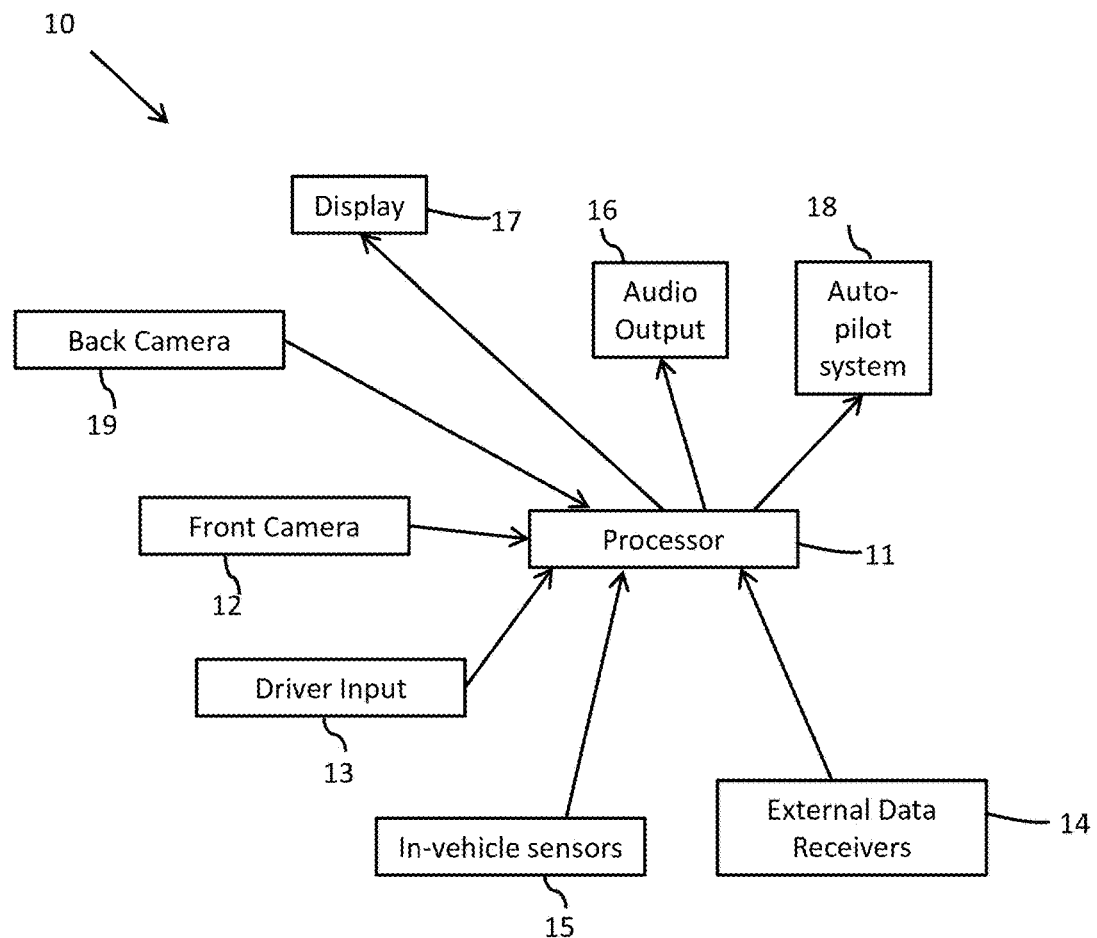
FIG. 1 is a schematic, block diagram of an in-vehicle system for monitoring the safety of a vehicle passing maneuver, according to an embodiment of the present invention.

FIG. 1 is a schematic, block diagram of an in-vehicle, monitoring system 10 for monitoring the safety of a vehicle performing a passing maneuver, according to an embodiment of the present invention. A processing device, such as an embedded processor 11 is configured to monitor a driving maneuver, a process that includes receiving and processing input from one or more sources. The input sources include a camera, which may be a camera with a 360 degree view around the vehicle, or multiple cameras, such as a front camera 12, and a back camera 19. Inputs also may include a driver input 13, in-vehicle sensors 15, and one or more external data receivers 14. In some embodiments, the cameras include a complementary metal-oxide-semiconductor (CMOS) megapixel chip or similar sensor. The cameras typically also include a light emitter, which may be an infrared, conduction-cooled bar package (CCP) or similar emitter. Typically, the light emission is pulsed, operating in continuous wave mode (CW) or quasi-continuous wave mode (Q-CW). The processor controls the light emitter and gets images from the camera sensor. Images may include images with reflections of emitted light and images without such reflections, enabling the processor to process the two types of images and to filter all light other than the reflections.

A driver of the vehicle may be a human driver or an autonomous computer-based mechanism for controlling the operation of the vehicle. Data received from external sources may include GPS data from GPS receivers or real-time vehicle location from a network that is based on the M2M communications system built into the vehicle. Data may also include map data received over wireless data networks, such as cellular 3G or 4G networks. Map data may also be stored in a memory of the processor. Based on this data, the processor may track the type of road on which a vehicle is being driven. When the road is determined to be a two lane road, the processor may receive a simple driver input, such as operation of the vehicle turn signal, or a driver voice command, as an indication that the driver intends to perform a passing maneuver. In additional embodiments, other means of driver input, such as a touch screen input, may be provided to indicate the driver's intent to pass. The intent may also be signaled by the driver moving the vehicle to the dividing line between lanes, or by moving farther into the opposing lane.

The processor processes images from the camera to determine speeds and positions of surrounding vehicles. The processor also monitors sensors that record aspects of the passing vehicle's own operation, and in particular the passing vehicle's speed. Based on the speeds and positions of the vehicles, the processor determines whether the passing maneuver is safe, and may then notify the driver. The notification may be by an audio output 16 or a screen display 17, or a signal 18 to an autonomous driver, that is, to an auto-pilot system.

In addition, the system may be configured with only one of cameras 12 and 19.

FIG. 2 is a schematic, pictorial illustration of a vehicle 22 in which is installed an in-vehicle monitoring system, according to an embodiment of the present invention. The vehicle is driven on a two lane, two-way road, that is, a road having one lane for traffic flow in the direction of the vehicle, and one or more opposing lanes designated for opposing, on-coming traffic.

During typical operation of an embodiment of the present invention, passing vehicle 22 is following one or more slow, leading vehicles, such as respective first and second leading vehicles 24 and 26. To avoid collision, passing vehicle 22 must travel at the slower speed of the leading vehicles. When overtaking the leading vehicles is safe, that is, when an on-coming vehicle 28, driving in the lane for on-coming traffic, is sufficiently far away, passing vehicle 22 can perform a passing maneuver safely. In embodiments of the present invention, the monitoring system described above, including front camera 12, monitors the speed and distance to on-coming vehicle 28 to provide a notice to the driver as to whether or not the passing maneuver is safe. Based on images from rear camera 19, the monitoring system may also monitor a trailing vehicle 21, to determine if the passing maneuver is safe.

Steps of operation of the monitoring system during the passing maneuver are illustrated in FIGS. 3A-3G, according to an embodiment of the present invention.

FIG. 3A shows the passing vehicle at a time $T_0$, at a position designated in the figure as a position $A_0$. The passing vehicle is following behind leading vehicle 24 in a forward lane 30 of a two lane road 32. The leading vehicle is slow and therefore impedes the progress of the passing vehicle.

The road has an opposing lane 34 for on-coming traffic, which is separated from the driver's forward lane by a road dividing line 36. In the illustration shown, the road is in a jurisdiction for right-hand traffic (RHT), such that the forward lane is on the right-hand side of the road and on-coming traffic flows to the left of a vehicle. A mirror image of the illustration would show the scenario for a left-hand traffic (LHT) jurisdiction.

Due to the slow speed of the leading vehicle, the driver of the passing vehicle decides to attempt a passing maneuver.

FIG. 3B shows the passing vehicle at a time $T_1$ at position $A_1$, at which point the driver conveys to the processor his intention to pass. At this point the speed of the leading vehicle is $v_0$, and its distance from the passing vehicle is $z_{B1}$. Typically, $z_{B1}$ is no less than the minimum safe driving distances between two vehicles, for example, a distance that maintains a 1-2 second time gap between the vehicles. The driver's intent may be conveyed to the processor of the monitoring system by one of the input means described above, such as moving to the center line.

Upon receiving the intent to pass indication from the driver, the processor begins to receive data to determine the safety of the passing maneuver. The front camera has a line of sight 40 to the on-coming vehicle 28, the line of site being within a field of view 42 of the front camera. As described further hereinbelow, the camera may be equipped with a means of automatically moving the field of view if necessary to detect and track the on-coming vehicle.

From multiple images of the on-coming vehicle, the processor determines the speed and distance between the passing vehicle and the on-coming vehicle, the determination being made by algorithms described further hereinbelow. The camera, or an alternate form of distance sensor, such as a radar-based narrow beam sensor, also has a line of sight 44 to the leading vehicle, and may use similar algorithms to determine the leading vehicle's position and speed.

FIG. 3C shows the passing vehicle at a time $T_2$ at position $A_2$. The processor has determined the various parameters which are sufficient for calculating a safety level of the passing maneuver. The speed of the on-coming vehicle is $v_C$, and the distance to the on-coming vehicle is $Z_2$. The speed of the leading vehicle is $v_0$ and its distance from the passing vehicle is $z_{B2}$. Between time $T_1$ and $T_2$, the passing vehicle has accelerated from velocity $v_0$ to velocity $v_1$. During this time, the passing vehicle has travelled a distance $L_{B1}$ and the leading vehicle has travelled a distance $L_{B2}$, where $$L_{B1}=(T_2-T_1)(V_0+V_1)/2;$$

$$L_{B2}=(T_2-T_1)(V_0).$$

The safety level of the maneuver is based on a calculation by the processor that the passing vehicle can perform the maneuver in the opposing lane and return to the forward lane before coming too close to the on-coming vehicle. At time $T_2$, the processor transmits to the driver an audio and/or visual notification of the safety level determination, the notification being conveyed by a speaker system and/or by an in-vehicle display as described below with respect to FIG. 8. The notification may also include a message indicating a target speed that the passing vehicle must achieve by accelerating, in order to complete the maneuver safely. Alternatively, the processor may determine that the safety level does not meet the necessary threshold or cannot be calculated, for example, if an on-coming vehicle cannot be identified in the received images. In either case, the driver is notified at this point of the safety level determination.

Upon receiving the notification that the maneuver meets the required safety level, the driver proceeds with the maneuver by moving the vehicle into the opposing lane and continuing to accelerate. As shown in FIG. 3D, the passing vehicle, at a position $A_3$, has moved into the opposing lane. At a subsequent time, indicated in FIG. 3E as a position $A_4$, the passing vehicle has passed the leading vehicle and begins its return to the forward lane.

Throughout the period of the passing maneuver, the processor continues to receive camera images to monitor the continued safety of the process. The likelihood of safely completing the maneuver may drop if the driver does not sufficiently accelerate, or if the on-coming vehicle's speed increases. In either event, the processor notifies the driver to abort the maneuver, that is, to decelerate and to re-enter the forward lane behind the leading vehicle.

Assuming that the passing maneuver is not aborted, at a position $A_5$, at time $T_5$, as shown in FIG. 3F, the passing vehicle completes the maneuver, returning to the forward lane, at a safe leading distance, $z_{B5}$, in front of the previously leading vehicle, and at a safe on-coming distance $Z_5$ from the on-coming vehicle. The processor may determine that the passing car has reached the safe leading distance by processing back camera images. Based on the determination that the leading distance is safe, the processor may also provide a notification to the driver that returning to the forward lane is safe.

Also shown in FIG. 3F is the on-coming vehicle, at a position $C_5$. The total distance travelled by the passing vehicle from the time of the initial safety notification to the completion of the maneuver is $L_T$, and the total time of the maneuver is T. The on-coming vehicle over this time period travelled from point $C_2$ to position $C_5$.

Generally, the processor determines the safety level at the initial time, $T_2$, by determining that $Z_5$, the final distance between the passing vehicle and the on-coming vehicle, is predicted to exceed a preset threshold ε. This threshold may be set, for example, to 50 meters. At time $T_2$, the distance between the vehicles is $Z_2$. For the maneuver to be completed safely, $Z_2$ must be greater than the distance that the passing vehicle will travel, plus the distance that the on-coming vehicle will travel, plus the threshold ε, that is:

$$Z_2 > \varepsilon + L_T$$

where:

$$T=2*[(v_0 t_S + l_m)/(v_1-v_0)]-(v_1-v_0)/2a$$

$$L_T=(v_1+v_C)*T$$

Figure 3G:
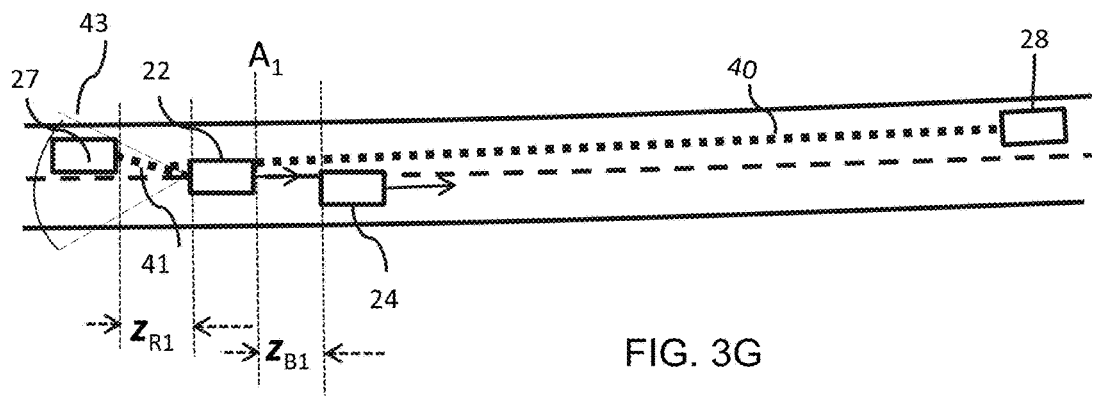

T: Time of traveling ($A_2$ to $A_5$)
$L_T$: Distance traveled by passing vehicle and by on-coming vehicle during time T
$v_0$: Initial speed of passing vehicle and of leading vehicle
$t_S$: Safe time gaps between passing vehicle and leading vehicle
$l_m$: length of passing vehicle (and assumed length of leading vehicle)
$v_1$: Target speed of passing, reached by passing vehicle during maneuver
a: Acceleration rate of passing vehicle FIG. 3G shows the passing vehicle at a time $T_1$, at position $A_1$, in an alternate scenario in which a trailing vehicle 27 following behind the passing vehicle is also attempting a passing maneuver. At this point the speed of the leading vehicle is $v_0$, and its distance from the passing vehicle is $z_{B1}$. Upon receiving the intent to pass notification from the driver, the processor begins to receive data both from the front camera and from the rear camera to determine the safety of the passing maneuver. The front camera has a line of sight 40 to the on-coming vehicle 28, as described above with respect to FIG. 3B. In addition, the rear camera has a line of site 41 to the trailing vehicle, within a field of view 41 of the rear camera. Both cameras may be equipped with means of automatically moving the field of view if necessary to detect and track the respective trailing and on-coming vehicles. From multiple images of the trailing vehicle, the processor may determine the speed, $v_{R1}$, and distance, $z_{R1}$, between the passing vehicle and the trailing vehicle, the determination being made by algorithms described further hereinbelow, similar to the algorithms for determining the distance and speed between the passing vehicle and the on-coming vehicle. The speed and distance of the trailing vehicle may also be factors in the determination by the processor of the safety of the passing maneuver.

Figure 4:
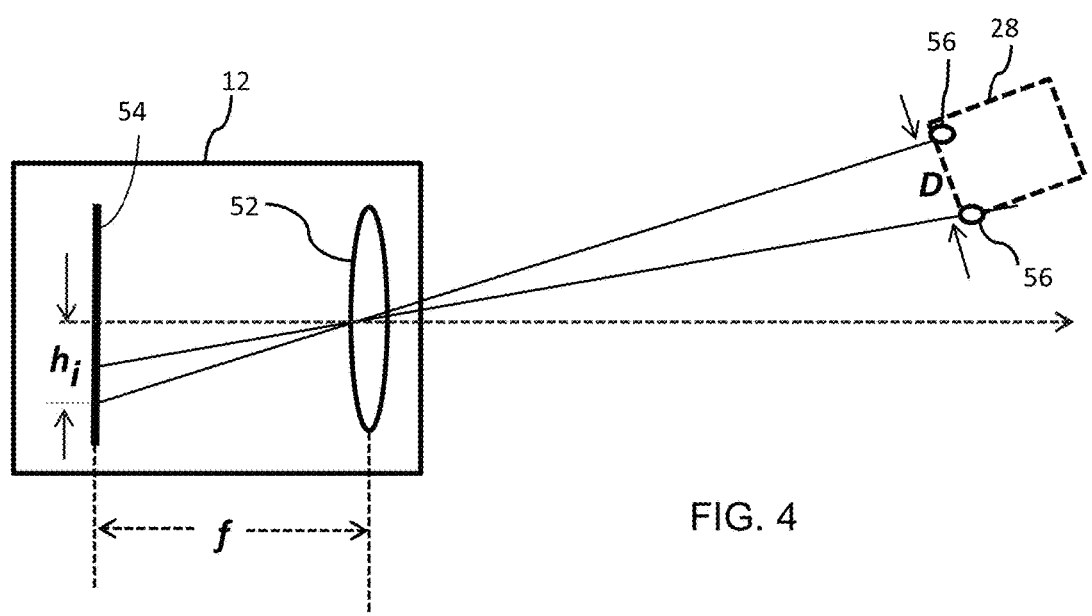
FIG. 4 is a schematic, pictorial illustration of an in-vehicle camera recording an image of an on-coming vehicle, according to an embodiment of the present invention.

FIG. 4 is a schematic, pictorial illustration of in-vehicle camera 12, described above, recording an image of on-coming vehicle 28, according to an embodiment of the present invention. As described above, when the processor receives the user indication for passing, it begins the process of determining a safety level by processing images that include laser reflections from the on-coming vehicle. The processor is generally configured to detect pixels in an image corresponding to reflections from front headlights 56 of the on-coming vehicle. The reflections are imaged on sensor 54 of the camera. A distance between the headlights, indicated as distance D, is proportional to a distance between pixels of the headlight reflection images, indicated in the figure as $h_i$, divided by the lens focal length, f. The subscript of the parameter, i, indicates the time of the measurement.

Figure 5:
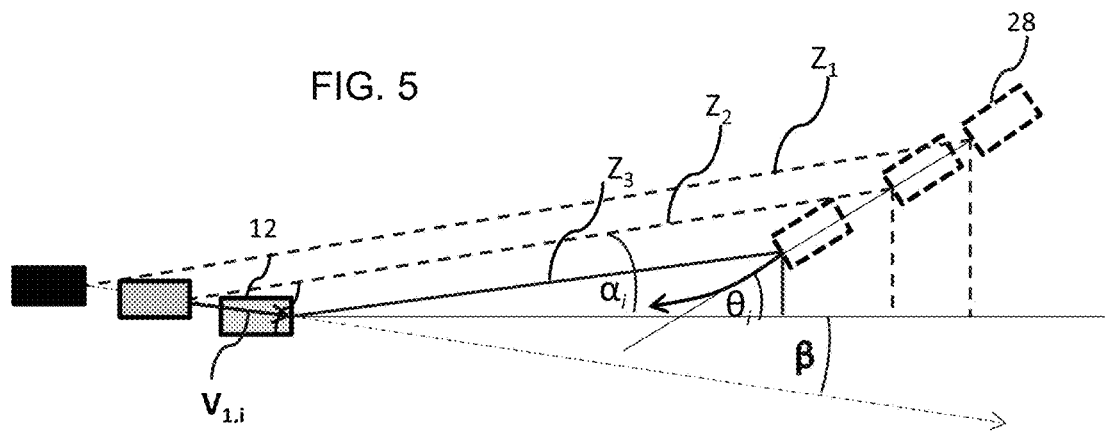
FIG. 5 is a schematic, pictorial illustration of an in-vehicle camera recording multiple images of an on-coming vehicle, according to an embodiment of the present invention.

FIG. 5 is a schematic, pictorial illustration of in-vehicle camera 12 recording multiple images of on-coming vehicle 28, according to an embodiment of the present invention. Multiple images are required in order to determine the velocity $v_C$ of the on-coming vehicle, which may be determined as a function of the distance between headlights, D.

As shown in the figure, images are recorded at three distinct times, for three relative distances between the passing vehicle and the on-coming vehicle. These are noted as respective distances, $z_1$, $z_2$, and $z_3$.

The relations between these distances, the speeds of the passing and on-coming vehicles, and the lens parameters described above are as follows:

$$z_1 - z_2 = Df * \left(\frac{1}{h_1} - \frac{1}{h_2}\right) = Df/H_1$$

$$z_2 - z_3 = Df * \left(\frac{1}{h_2} - \frac{1}{h_3}\right) = Df/H_2$$

$$z_1 - z_2 = (v_{1,1} + v_{1,2})/2\Delta t + v_c \Delta t$$

$$z_2 - z_3 = (v_{1,2} + v_{1,3})/2\Delta t + v_c \Delta t$$

$$\Rightarrow$$

$$D = (v_{1,3} - v_{1,1})\Delta t * H_2 H_1 / 2f(H_1 - H_2)$$

$$v_c = Df/H_1 \Delta t - (v_{1,1} + v_{1,2})/2$$

where:

$$H_i = 1 \Big/ \left(\frac{1}{h_i} - \frac{1}{h_{i+1}}\right)$$

D: distance between headlights of on-coming vehicle;

$h_i$: distance from headlight pixels in image recorded on sensor of camera relative to the center of the image;

$v_C$: velocity of on-coming vehicle;

$v_{1,1}$, $v_{1,2}$, $v_{1,3}$: velocities of passing vehicle, at three distinct times (separated by a constant time difference), calculated initially during time period as the vehicle travels from $A_1$ and $A_2$, and subsequently on an on-going basis until the end of the maneuver (position $A_5$). Note: The velocity of the passing vehicle is changing as the passing vehicle begins to accelerate.

As indicated in FIG. 5, which is an overhead view of the field of view of camera 12, the road may not be straight, but rather curved, in which case the line of site between the camera and the on-coming car may be an angle $\alpha_i$, from a perpendicular projection from the sensor. The angle between that perpendicular project and the plane of the headlights is an angle $\theta_i$ and the angle between the line of site and the passing vehicle may be an angle $\beta$.

The above equation then needs to be adjusted, such that:

$$z_i = Df * \cos\theta_i \cos\alpha_i /(h_{i+1} - h_i) + \frac{D}{2} * \sin\theta_i \cos\alpha_i (h_{i+1} + h_i)/(h_{i+1} - h_i)$$

$$z_{i+1}\cos\alpha_{i+1} = z_i \cos\alpha_i - v\Delta t * \cos\theta_i - (v_{1,i+1} + v_{1,i})/2\Delta t * \cos\beta$$

Figure 6:
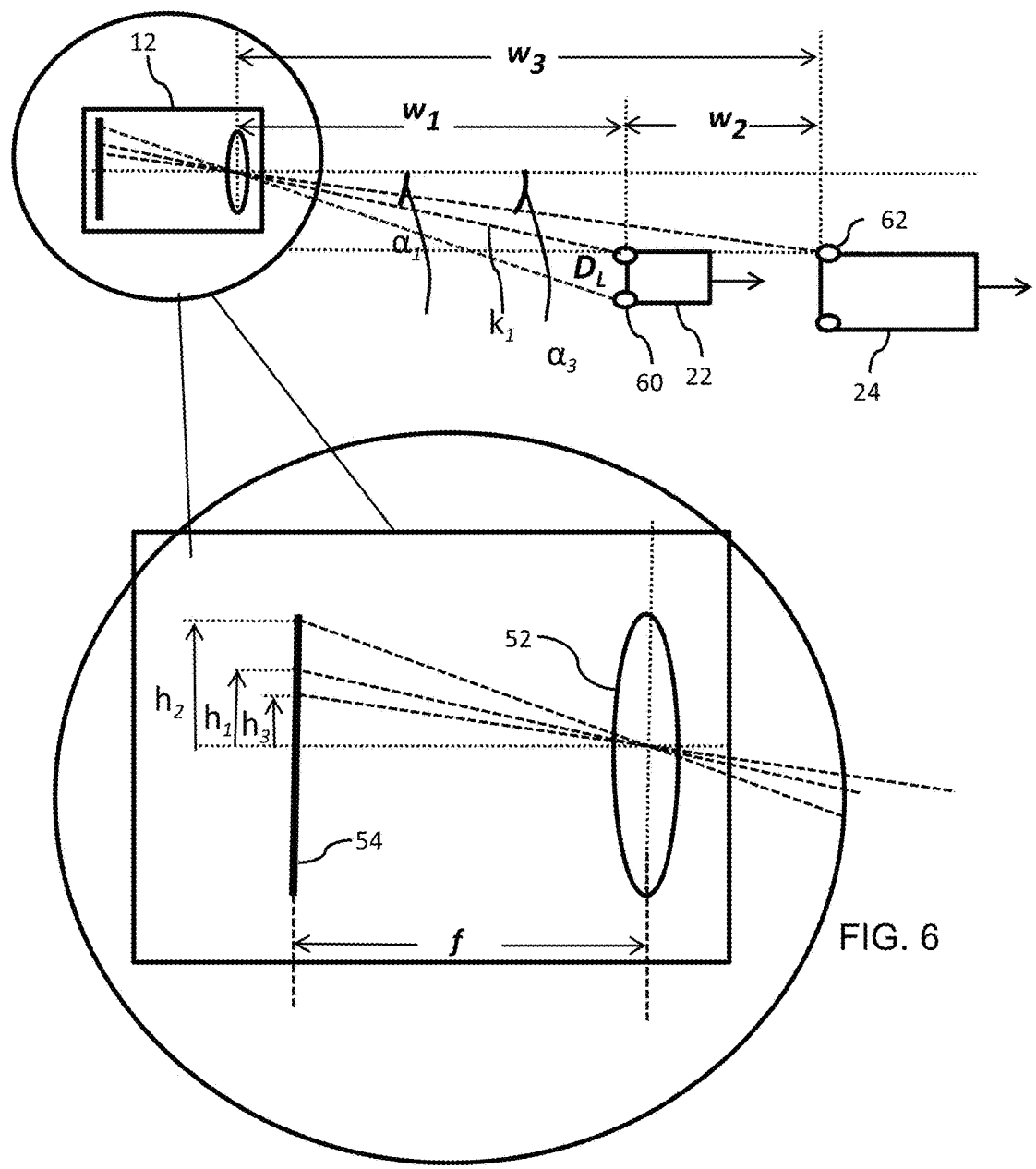
FIG. 6 is a schematic, pictorial illustration of an in-vehicle camera recording multiple images of multiple leading vehicles, according to an embodiment of the present invention.

FIG. 6 is a schematic, pictorial illustration of an in-vehicle camera recording multiple images of multiple leading vehicles, according to an embodiment of the present invention. In a situation in which there are several leading vehicles, indicated in FIG. 6 as respective first and second leading vehicles 22 and 24, the total distance to be traveled by the passing vehicle is greater. At time $A_1$, described above with respect to FIG. 3B, the passing vehicle has moved towards the dividing line. The distance to the first passing vehicle may be measured with an algorithm similar to that applied to calculate the distance to the on-coming vehicle, that is, from pixel images of the reflections of two rear tail lights 60 of the first leading vehicle. These pixel images are indicated in the figure as being at positions $h_2$ and $h_3$ of the camera sensor 54 (positioned at the focal distance f, from the lens system 52).

However, only the left tail light 62 of the second leading vehicle may be in the field of view of the passing vehicle (or the right tail light, for a LHT jurisdiction), because the second tail light may be hidden by the first leading vehicle. Given that the two vehicles are following each other such that the left tail lights of the two leading vehicles are in approximately a line, which is parallel to the flow of traffic, the following equations hold for determining the distance between the passing vehicle and the second leading vehicle:

$$\tan(\alpha_i) = h_i/f$$

$$k_1 = w_1/\cos(\alpha_1)$$

$$w_1 = D_L * f/(h_2 - h_1)$$

$$k_1/\sin(\alpha_1) = w_2/\sin(\alpha_1 - \alpha_3)$$

$$w_3 = w_1 + w_2$$

where:

$k_1$: Distance from passing vehicle camera to first leading vehicle left tail light;

$w_1$: distance from passing vehicle to first leading vehicle (measured from planes of respective front and rear sides of vehicles);

$w_2$: distance from first leading vehicle to second leading vehicle (measured from planes of respective rear sides of vehicles);

$w_3$: distance from passing vehicle to second leading vehicle (measured from planes of respective front and rear sides of vehicles).

Figure 7:
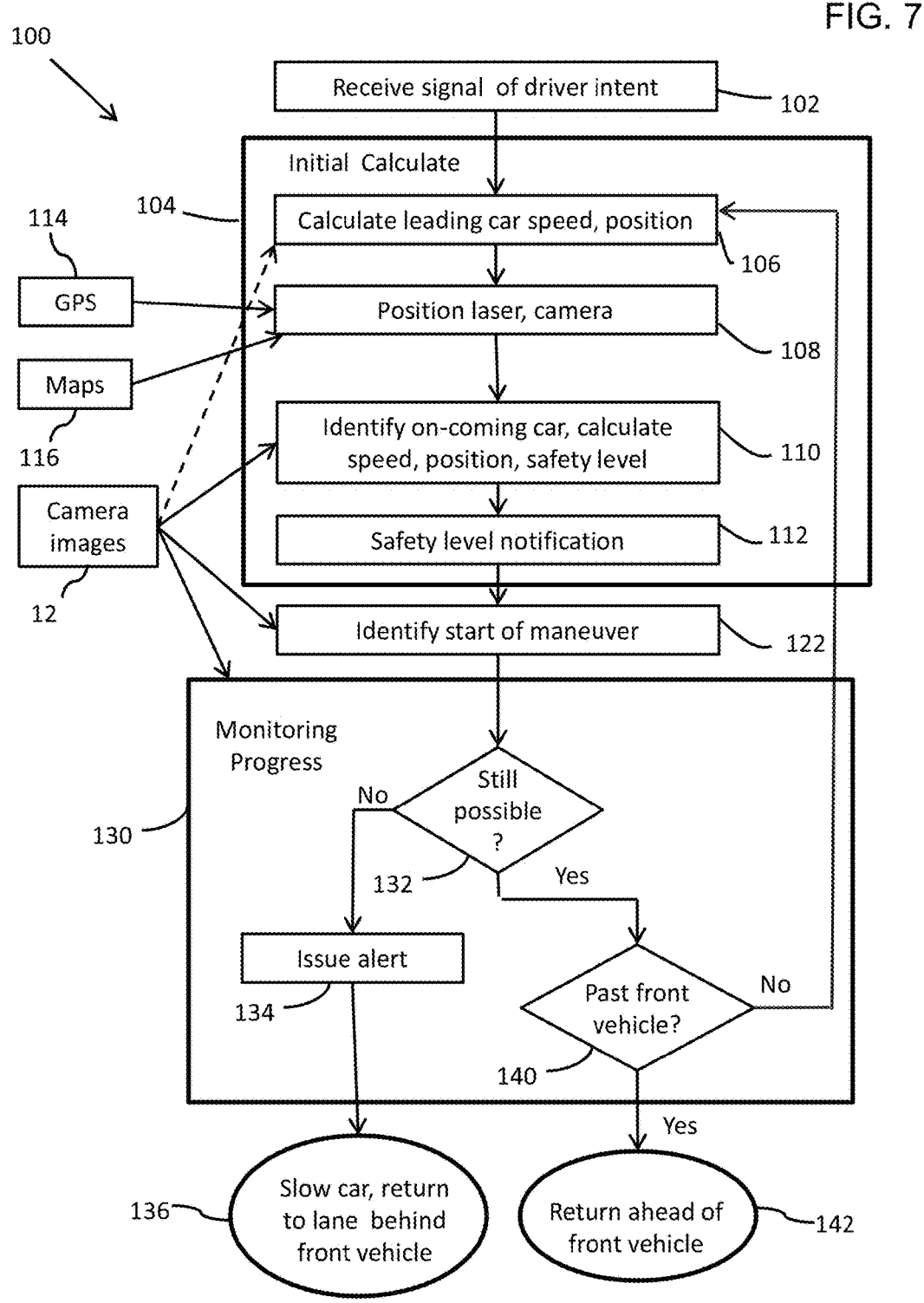
FIG. 7 is a flow diagram of a process for real-time monitoring of a vehicle passing another vehicle by entering a lane designated for on-coming traffic, according to an embodiment of the present invention.

FIG. 7 is a flow diagram of a process 100 for real-time monitoring of a passing vehicle performing a passing maneuver, according to an embodiment of the present invention. The processor of the monitoring system receives an indication of the driver's intent to overtake a leading vehicle, at an initial step 102. The indication may be provided, as described above with respect to FIG. 3B, when the passing vehicle travels onto the dividing line at position $A_1$. Alternatively, the driver may provide an in-vehicle signal, such as operating a turn signal. The driver indication triggers the processor to perform a calculation process 104 to determine a safety level of the maneuver. Alternatively, the processor may be continually performing the calculation process, waiting for the driver to indicate that he is beginning the maneuver.

The calculation process includes steps 106-112. At step 106, the processor calculates the speed and distance to the leading vehicle, or vehicles. This is performed either by measuring tail light reflectance in images from camera 12, and then performing the calculations as described above, or by other distance measuring means, such as Doppler-based radar sensing. In typical operation, the monitoring system is configured to measure the leading vehicle speed and distance continuously, in order to provide safety notifications to the driver during normal operation of the car, not only when the driver wants to overtake the leading car.

At step 108, the processor positions the camera such that the field of view includes the opposing lane. This may be required, for example, if the opposing lane curves significantly, or if the road has a steep upward slope. At this step, the processor may receive location data input 114 (such as GPS-based location data) and map input 116 to determine topographical aspects of the road. For example, when a portion of the road ahead is not visible, perhaps due to a dip in the road obscuring possible on-coming vehicles, the processor may be configured to provide a notification of the risk without performing further calculations.

At the subsequent step 110, the processor receives camera images from camera 12, in which appear reflections of headlights of the on-coming vehicle. The processor calculates a safety level from the changing positions of the headlight pixels in the images, as described above. Steps 108 and 110 may also be iterative steps, as the processor may determine that the image resolution is not sufficient, in which case the camera may zoom into a narrower field of view. This may also include reorienting the camera such that the headlight reflections remain in the narrower field of view.

After determining whether or not a passing maneuver would meet the required safety criteria, the processor at step 112 provides the driver with a safety level notification.

When that the passing maneuver meets the safety criteria and the processor has provided a notification to proceed, the processor waits to receive an indication from the driver that the maneuver is starting. This may be indicated by further movement into the opposing lane.

At a step 122, the processor receives the indication that the maneuver is beginning. The processor begins a monitoring process 130, monitoring the on-going progress and safety of the maneuver. During the monitoring process, the processor continues to receive and to process images of the on-coming vehicle. On a continuous basis until the end of the maneuver, the processor, at a decision step 132, confirms that the maneuver is still safe to complete. The processor may also be monitoring at a simultaneous step 140 the position and speed of the leading vehicle. If the maneuver is still possible, but the leading vehicle has not been passed, the processor reiterates step 106. If the speed and distance calculations indicate that the maneuver is no longer safe, the processor issues an alert at a step 134. The alert is generally to abort and fall back. Alternative alerts may include notifying the driver of the need to accelerate, or to pull off the road. If the alert is to abort, the driver, at a step 136, slows the car and returns to the lane behind the leading vehicle. If the passing vehicle has passed the leading vehicle, the driver, at a step 142, moves the vehicle back to the forward lane in front of the (formerly) leading vehicle.

FIG. 8 is a schematic, pictorial illustration of an in-vehicle display screen 180 for providing safety notifications, according to an embodiment of the present invention. The display may be a stand-alone display for an ADAS system or an existing vehicle multimedia/GPS navigation system display, which may be used to display the notifications as shown in FIG. 8. Alternatively, the notification may be shown on the driver's smartphone, PDA, or navigation device display. The notification may include a text message 182, as well as an indication of the required passing speed, 184. In some embodiments, the monitoring system is configured with local maps or means of communication to determine the maximum legal speed limit, and the maneuver is not deemed safe unless the required passing speed is less than the maximum legal speed limit.

The display screen may also include a video view 186 of the road ahead, confirming visually for the driver the vehicles that the processor has identified.

FIGS. 9A and 9B are pictorial orthogonal views of a common deflector laser camera 200 for recording images of on-coming traffic, according to an embodiment of the present invention. The camera includes an image sensor 202, as well as a lens system 204, which may be adjusted automatically by the processor by means of lens drive 206. The lens system may also include a zoom system 208 and an interference filter 210. The camera also includes a laser emitter 212, which may have an independent lens system 214.

As described above, the field of view of the camera may be oriented to include the on-coming vehicle. A deflector mirror 220, controlled by driver 218, may be oriented according to commands from the processor to change the field of view of both the emitter and the sensor. The sensor is typically a high resolution CMOS sensor, such as a 40 megapixel sensor, providing sufficient resolution to detect the reflected headlights of the on-coming vehicle at distances of 1 km and more. The laser emitter is typically a narrow bandwidth infrared laser, such as an 830 nm diode bar. The power, dispersion, and duty cycle of the emitter are configured to conform to the International Electrotechnical Commission (IEC) 60825-1 standard for safety of laser products.

Figures 10A, 10B:
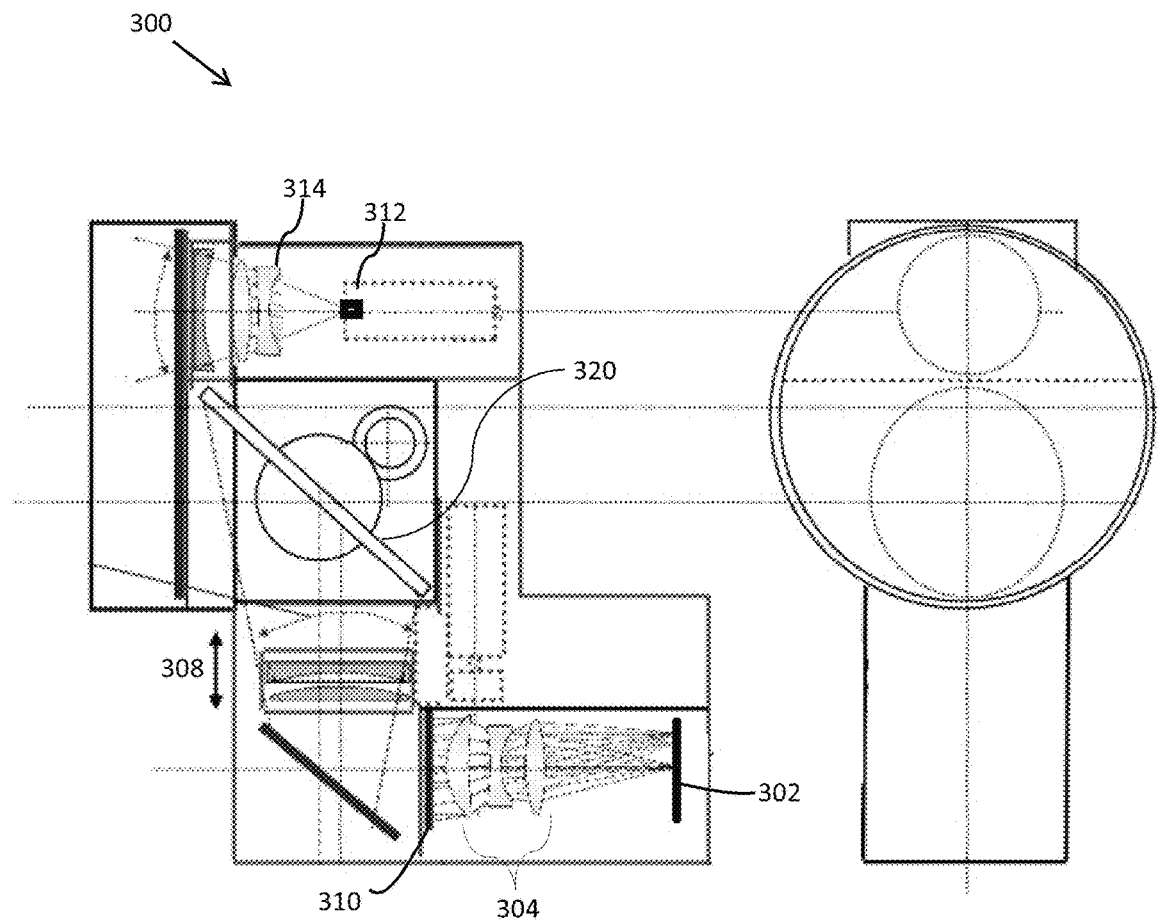
FIGS. 10A and 10B are pictorial orthogonal views of a separate emitter camera with an emitter and a sensor that are independent, according to an embodiment of the present invention.

FIGS. 10A and 10B are pictorial orthogonal views of a separate emitter laser camera 300 with an emitter and a sensor that are independent, according to an embodiment of the present invention. Camera 300 includes an image sensor 302, and a sensor lens system 304, whose focus may be adjusted automatically by the processor. The sensor lens system may also include a zoom system 308 and an interference filter 310. The camera also includes a laser emitter 312, which may have an independent emitter lens system 314.

A deflector mirror 320 may be oriented according to commands from the processor to change the field of view of the sensor. In the separate emitter laser camera 300, in contrast to the common deflector laser camera 200, the field of view (FOV) of the sensor may be different from the FOV of the emitter, as the emitter FOV may be configured to be larger than that for the sensor, especially when the sensor FOV is narrowed by the zoom system.

Figure 11:
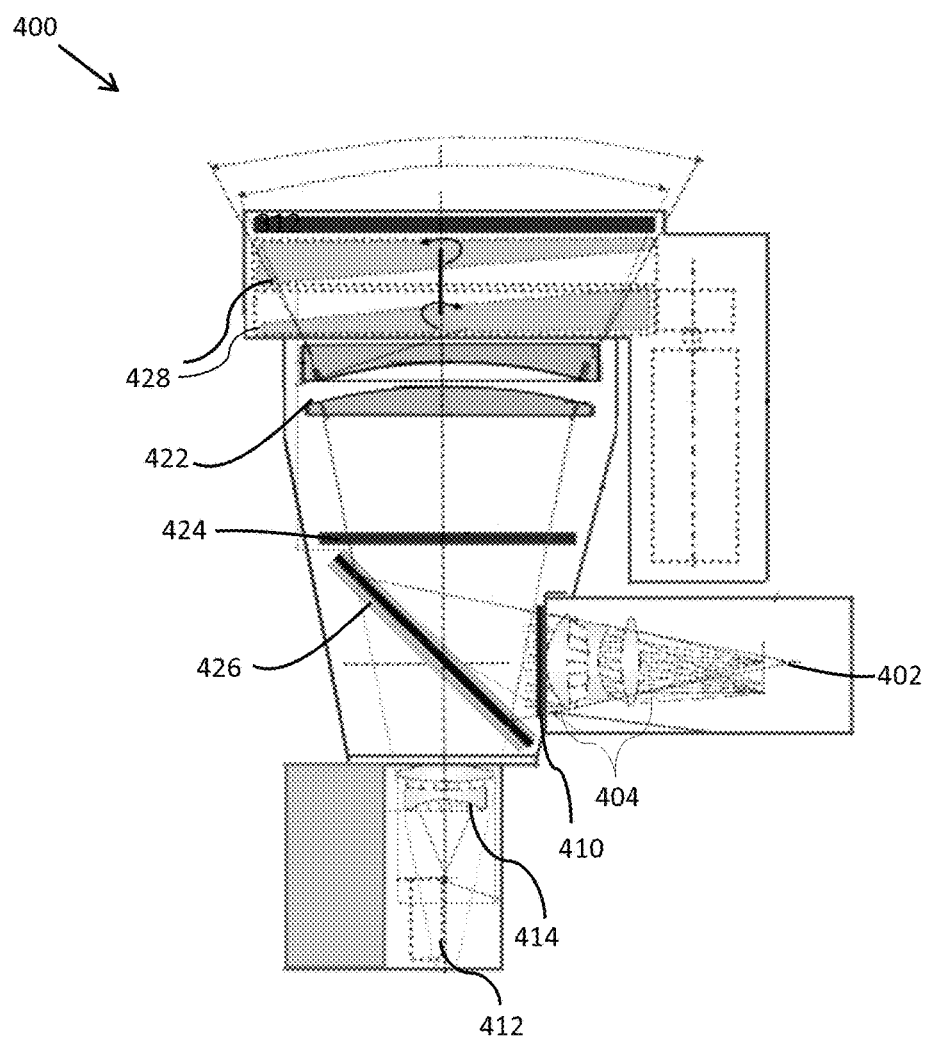
FIG. 11 is a pictorial view of a common lens camera with an emitter and a sensor having a common lens system, according to an embodiment of the present invention.

FIG. 11 is a pictorial view of a common lens laser camera 400 with a laser emitter and an image sensor having a common lens system, according to an embodiment of the present invention.

The common lens laser camera includes an image sensor 402, and a sensor lens system 404, whose focus may be adjusted automatically by the processor. The sensor lens system may also include an interference filter 410 and a zoom system, not shown. The camera also includes a laser emitter 412, which may have an independent lens system 414.

Camera 400 has several elements common to both the emitter and the sensor. These include a portion of the lens system 422 and an optical half-wave plate 424, configured at the wavelength of the emitter, such as 830 nm. An additional element may be a wire grid polarizing film 426, which transmits light exiting from the emitter, but reflects returning light towards the sensor.

To orient the FOV of the sensor and the emitter, camera 400 may also have a set of wedge prisms 428. Adjustment of the orientation directs the FOV, according to instructions from the processor.

It is to be understood that elements of cameras 200, 300 and 400 may be combined in different combinations in different embodiments of the present invention.

Processing elements of system 10 and of process 100 and of other embodiments may be implemented in digital electronic circuitry, or in computer hardware, firmware, software, or in combinations thereof. Such elements can be implemented as a computer program product, tangibly embodied in an information carrier, such as a non-transient, machine-readable storage device, for execution by, or to control the operation of, data processing apparatus, such as a programmable processor, computer, or deployed to be executed on multiple computers at one site or distributed across multiple sites. Memory storage may also include multiple distributed memory units, including one or more types of storage media. Examples of storage media include, but are not limited to, magnetic media, optical media, and integrated circuits such as read-only memory devices (ROM) and random access memory (RAM). The system may have one or more processors and one or more network interface modules. Processors may be configured as a multi-processing or distributed processing system. Network interface modules may control the sending and receiving of data packets over networks.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A vehicle-installed system for generating a safety level notification with respect to a passing vehicle maneuvering to overtake a leading vehicle by travelling in an opposing lane designated for on-coming traffic, the system comprising:
    a camera comprising a light emitter configured to emit a narrow bandwidth light, an image sensor, and a lens subsystem; and
    a processor communicatively coupled to the camera and to a memory that comprises computer-readable instructions, which cause the processor to perform the steps of:
    identifying a start of an overtaking maneuver;
    determining a speed and a position of the leading vehicle;
    receiving images from the camera;
    processing the images to calculate a speed and a position of an on-coming vehicle travelling in the opposing lane and approaching the passing vehicle;
    responsively to the speeds and positions of the leading and on-coming vehicles, determining a safety level of performing an overtaking maneuver;
    providing a notification of the safety level to a driver of the passing vehicle; and
    continuing to perform safety level calculations and providing additional safety level notifications while the overtaking maneuver is in progress.

2. The system of claim 1, wherein the driver is a human driver or an autonomous system for controlling the passing vehicle.

3. The system of claim 1, wherein determining the safety level comprises determining a required passing speed.

4. The system of claim 3, wherein providing the notification comprises providing an indication of the required passing speed.

5. The system of claim 1, wherein the processor is further configured to display the notification of the safety level on a screen viewable by the driver, wherein the display is a stand-alone display, or an existing vehicle multimedia/GPS navigation display, or a smartphone/PDA display.

6. The system of claim 1, wherein the driver is an autonomous system and the processor is configured to provide the notification by transmitting the notification to the autonomous system.

7. The system of claim 1, wherein the safety level notification is one of a set of possible notifications comprising a first notification that the maneuver is safe and a second notification that the maneuver is unsafe.

8. The system of claim 1, wherein the processor is further configured to receive a driver input to initiate the overtaking calculation.

9. The system of claim 8, wherein the processor determines from location data that the passing vehicle is traveling on a two-lane road, and wherein the driver input is received from a turn signal, or from an indication of the passing vehicle crossing a road dividing line, or from a verbal instruction.

10. The system of claim 1, wherein processing the images comprises identifying a representation of the on-coming vehicle in the images.

11. The system of claim 10, wherein identifying the representation of the on-coming vehicle comprises identifying reflections of the narrow bandwidth light from at least two positions on the on-coming vehicle, and wherein calculating the speed and position of the on-coming vehicle comprises determining a change in positions of the reflections between at least three of the images.

12. The system of claim 11, wherein calculating the speed and position of the on-coming vehicle further comprises receiving the images while the speed of the passing vehicle is changing.

13. The system of claim 11, wherein identifying the representation of the on-coming vehicle comprises adjusting a zoom and field of view of the camera.

14. The system of claim 1, wherein receiving the images further comprises determining a contour of the opposing lane from location data and responsively orienting the camera to a view of the lane.

15. The system of claim 1, wherein the laser emitter and the image sensor respectively transmit and receive laser pulses through one or more common lenses of the lens subsystem.

16. The system of claim 1, wherein determining a speed and a position of the leading vehicle comprises determining a speed and a position of two leading vehicles, and wherein the processor is further configured to determine a safety level of overtaking both leading vehicles.

17. The system of claim 1, wherein the camera is a front camera and wherein the system further comprises a back camera.

18. A vehicle-installed system for generating a safety level notification with respect to a passing vehicle maneuvering to overtake a leading vehicle by travelling in an opposing lane designated for on-coming traffic, the system comprising:
- a front camera comprising a light emitter configured to emit a narrow bandwidth light, an image sensor, and a lens subsystem;
- a back camera; and
- a processor communicatively coupled to the front camera and to a memory that comprises computer-readable instructions, which cause the processor to perform the steps of:
- determining a speed and a position of the leading vehicle;
- receiving images from the front camera;
- processing the images to calculate a speed and a position of an on-coming vehicle travelling in the opposing lane and approaching the passing vehicle;
- responsively to the speeds and positions of the leading and on-coming vehicles, determining a safety level of performing an overtaking maneuver;
- providing a notification of the safety level to a driver of the passing vehicle; and
- determining from images from the back camera that the passing vehicle can safely return from the opposing lane to a position in front of the leading vehicle; and
- providing a notification that return from the opposing lane is safe.

19. A vehicle-installed system for generating a safety level notification with respect to a passing vehicle maneuvering to overtake a leading vehicle by travelling in an opposing lane designated for on-coming traffic, the system comprising:
- a camera comprising a light emitter configured to emit a narrow bandwidth light, an image sensor, and a lens subsystem; and
- a processor communicatively coupled to the camera and to a memory that comprises computer-readable instructions, which cause the processor to perform the steps of:
- determining a speed and a position of the leading vehicle;
- receiving images from the camera;
- processing the images to calculate a speed and a position of an on-coming vehicle travelling in the opposing lane and approaching the passing vehicle;
- responsively to the speeds and positions of the leading and on-coming vehicles, determining a safety level of performing an overtaking maneuver; and
- providing a notification of the safety level to a driver of the passing vehicle, wherein determining the safety level comprises determining a required passing speed, and wherein determining the required passing speed comprises acquiring location data, and further comprises determining that the required passing speed does not exceed the legal maximum speed at the vehicle location.

* * * * *